United States Patent

Takeda et al.

[11] Patent Number: 6,070,811
[45] Date of Patent: Jun. 6, 2000

[54] FUEL INJECTOR FOR AN INTERNAL COMBUSTION ENGINE

[75] Inventors: Keiso Takeda, Mishima; Tomojiro Sugimoto, Susono; Susumu Kojima, Susono; Nobuhiko Koga, Susono; Tomoji Ishikawa, Okazaki, all of Japan

[73] Assignee: Toyota Jidosha Kabushiki Kaisha, Toyota, Japan

[21] Appl. No.: 09/166,927

[22] Filed: Oct. 6, 1998

[30] Foreign Application Priority Data

Oct. 8, 1997 [JP] Japan .................................. 9-276076

[51] Int. Cl.⁷ .................................................. F02M 61/00
[52] U.S. Cl. .................................. 239/533.12; 239/533.2; 239/533.3; 239/596; 239/601
[58] Field of Search ........................... 239/533.2, 533.12, 239/533.14, 592, 594, 596, 601, 533.3

[56] References Cited

U.S. PATENT DOCUMENTS

| | | |
|---|---|---|
| 4,591,099 | 5/1986 | Emory et al. ............... 239/596 X |
| 5,109,823 | 5/1992 | Yokoyama et al. ............ 239/533.12 X |
| 5,109,824 | 5/1992 | Okamoto et al. ............. 239/533.12 X |
| 5,346,137 | 9/1994 | Okamoto et al. . |

FOREIGN PATENT DOCUMENTS

| | | | |
|---|---|---|---|
| 827772 | 5/1938 | France ......................... | 239/533.12 |
| 3-78562 | 4/1991 | Japan . | |
| 5-272432 | 10/1993 | Japan . | |
| 9486 | 5/1923 | Netherlands .................... | 239/533.12 |

*Primary Examiner*—Andres Kashnikow
*Assistant Examiner*—Robin O. Evans
*Attorney, Agent, or Firm*—Oliff & Berridge, PLC

[57] ABSTRACT

A fuel injector for an internal combustion engine is disclosed. In the fuel injector, an opening on the outer side of the injection hole has a width generally larger than a height thereof. The width of the injection hole is gradually narrowed inward so that the fuel is injected at a predetermined angle in the direction of width. The height of the injection hole is nearly uniform in the direction of injecting the fuel within the predetermined angle in the direction of width. A height at both ends of the opening on the outer side of the injection hole is larger than the height at the central portion thereof.

5 Claims, 4 Drawing Sheets

FUEL INJECTOR FOR AN INTERNAL COMBUSTION ENGINE

BACKGROUND OF THE INVENTION

1. Field of the Invention

The present invention relates to a fuel injector for an internal combustion engine.

2. Description of the Related Art

According to Japanese Unexamined Patent Publication No. 5-272432, the injection hole of a fuel injector is formed like a slit. The fuel injected from this injection hole forms a flat triangular spray having a relatively small thickness and in which nearly all the fuel comes into sufficient contact with the air and is favorably atomized. The injection hole is communicated with a single fuel reservoir in the fuel injector. The fuel is injected through the injection hole as the pressure of the fuel in the fuel reservoir is increased.

In the above-mentioned injector, the velocity of injection of the fuel from each portion of the injection hole is not uniform even if the same fuel pressure is exerted from the fuel reservoir on each portion of the injection hole, i.e., the velocity of injection at both ends is affected by the wall surfaces of the injection hole and is generally retarded behind that of the central portion of the injection hole. When a velocity of injection is realized to favorably diffuse the fuel that is injected from the central portion of the injection hole, therefore, the velocity of injection of the fuel from each end of the injection hole is very retarded, and the fuel is excessively diffused on both sides of the triangular fuel spray. Therefore, the above-mentioned fuel injector is not capable of producing a fuel spray which realizes a generally favorable degree of diffusion.

SUMMARY OF THE INVENTION

The object of the present invention, therefore, is to provide a fuel injector for an internal combustion engine capable of forming a triangular fuel spray which realizes a generally favorable degree of diffusion.

According to the present invention, there is provided a fuel injector wherein an opening on the outer side of the injection hole thereof has a width generally larger than a height thereof, the width of said injection hole is gradually narrowed inward so that the fuel is injected at a predetermined angle in the direction of width, the height of said injection hole is nearly uniform in the direction of injecting the fuel within the predetermined angle in the direction of width, and a height at both ends of said opening on the outer side of said injection hole is larger than the height at the central portion thereof.

DESCRIPTION OF THE PREFERRED EMBODIMENT

Figure 1:
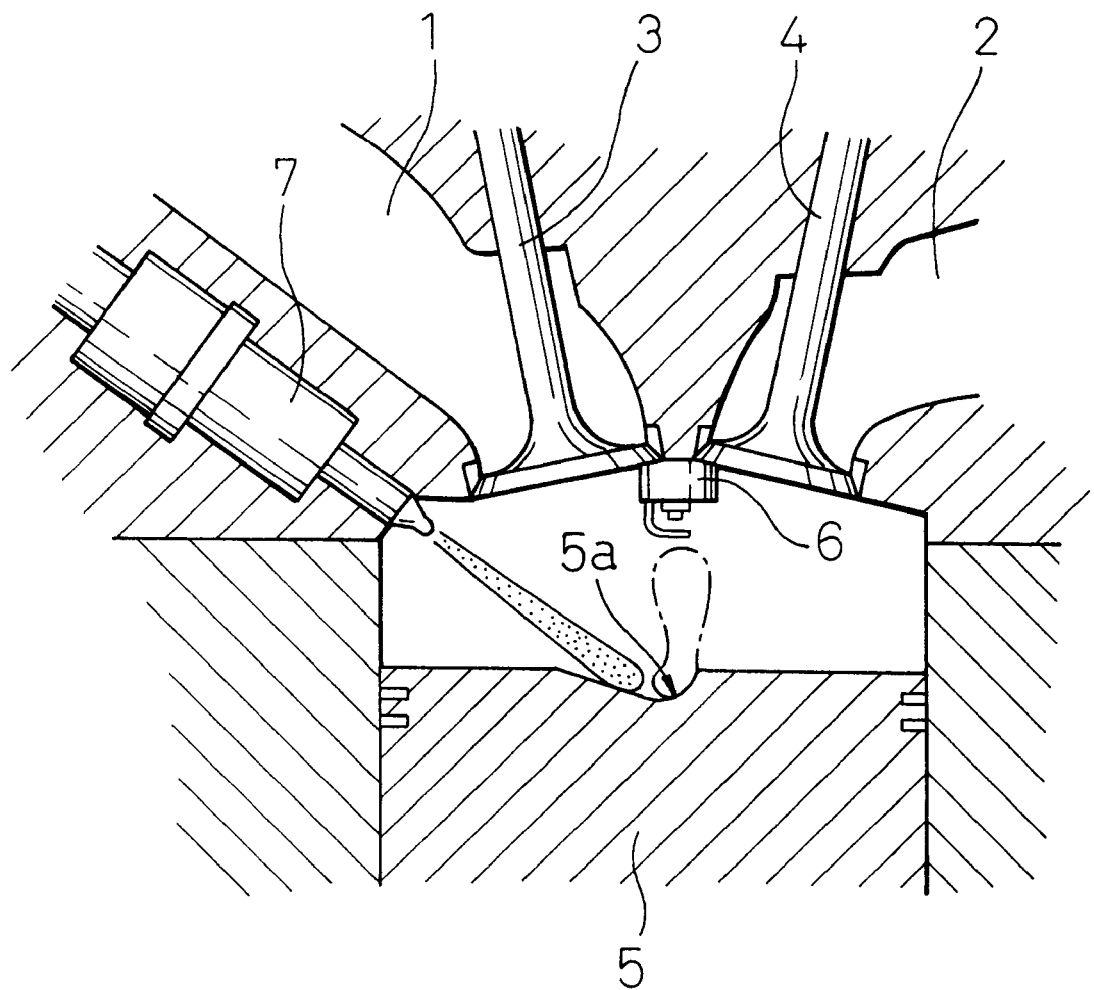
FIG. 1 is a sectional view schematically illustrating a direct cylinder injection-type spark-ignition internal combustion engine equipped with a fuel injector according to a first embodiment of the present invention.

FIG. 1 is a sectional view schematically illustrating a direct cylinder injection-type spark-ignition internal combustion engine equipped with a fuel injector 7 according to a first embodiment of the present invention. In FIG. 1, reference numeral 1 denotes an intake port and 2 denotes an exhaust port. The intake port is communicated with the interior of the cylinder via an intake valve 3, and the exhaust port 2 is communicated with the interior of the cylinder via an exhaust valve 4. Reference numeral 5 denotes a piston, and 6 denotes a spark plug arranged in an upper part of the combustion chamber. The fuel injector 7 directly injects the fuel into the cylinder toward the top surface of the piston in the latter half of a compression stroke. In the top surface of the piston 5 is formed a deflection groove 5a for deflecting the fuel injected from the fuel injector 7 toward the spark plug 6.

Figure 2:
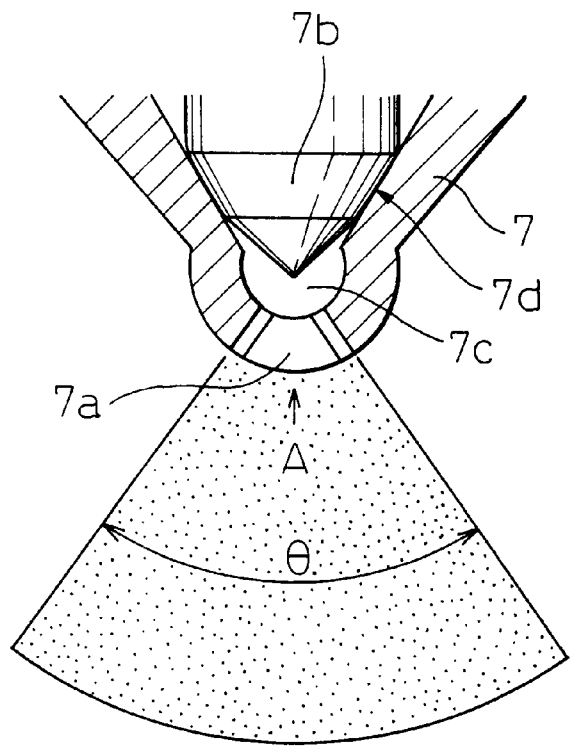
FIG. 2 is an enlarged sectional view illustrating the vicinity of an injection hole in the fuel injector of FIG. 1.
Figure 3:
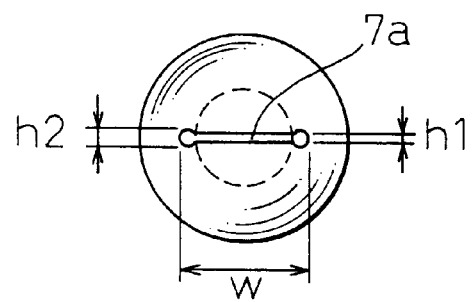
FIG. 3 is the view of FIG. 2 viewed from the direction of an arrow A.

FIG. 2 is an enlarged sectional view illustrating the vicinity of an injection hole 7a of the fuel injection valve 7, and FIG. 3 is the view of FIG. 2 viewed from the direction of an arrow A. In these drawings, reference numeral 7b denotes a valve body. 7c denotes a fuel reservoir communicated with the injection hole 7a, and 7d denotes a nozzle seat portion which can be closed by the valve body 7b. Only when the valve body 7b is pulled up is the fuel at a high pressure supplied to the fuel reservoir 7c via the nozzle seat portion 7d, whereby the pressure of the fuel is increased in the fuel reservoir 7c, and the fuel is injected from the injection hole 7a.

The opening on the outer side of the injection hole 7a has a curved but nearly rectangular shape with a width (w) larger than a height (h1) thereof. The injection hole 7a has a width which is gradually narrowed inward so that the fuel is injected at a predetermined angle θ in the direction of width. The height of the injection hole 7a remains nearly the same in each direction of injection within the predetermined angle θ. The fuel reservoir 7c is of a hemispherical shape, and the center thereof corresponds to the center of the predetermined angle θ in which the fuel is injected. Accordingly, the pressure of the fuel in the fuel reservoir 7c acts equally in every direction of injection in the injection hole 7a. A through hole having a circular cross section is formed at both ends of the injection hole 7a. The through hole has a relatively large diameter (h2) and, hence, the height (h2) at both ends is larger than the height (h1) at the central portion in the opening on the outer side of the injection hole 7a.

As shown in FIGS. 1 and 2, the fuel injected from the injection hole 7a of the thus constituted fuel injector 7 forms a flat triangular spray having a relatively small thickness corresponding to the height (h1) of the injection hole 7a, and whereby nearly all the fuel comes into sufficient contact with the air taken into the cylinder and is favorably atomized. Since the height (h2) at both ends of the injection hole is larger than the height (h1) at the central portion, the wall surface resistance decreases at both ends of the injection hole, and the fuel is injected from each portion of the injection hole 7a at nearly a uniform velocity of injection, making it possible to equalize the degree of diffusion.

If the fuel injector 7 is used for the direct cylinder injection-type spark-ignition internal combustion engine shown in FIG. 1, the triangular spray formed by the injected fuel is deflected toward the spark plug 6 by the deflection groove 5a formed in the top surface of the piston as the fuel is injected in a compression stroke for accomplishing a stratified combustion. The spray has a favorable degree of diffusion even on the sides and, hence, a deterioration in combustion due to overlean conditions can be prevented, and thus, a favorable stratified combustion is realized. The thus-formed fuel spray has a relatively small thickness, which makes it possible to increase the distance between the lowest and the highest positions of the piston where the fuel can be deflected toward the spark plug 6 by the deflection groove 5a in the top surface of the piston. During this relatively long period, a relatively large amount of fuel can be injected, and the region of stratified combustion can be expanded toward the high-load side. Even when the fuel injector 7 is used for a direct cylinder injection-type spark-ignition internal combustion engine in which the fuel injected in a compression stroke directly forms a stratified fuel mixture near the ignition plug, a deterioration in combustion due to overlean conditions can be prevented, and thus, a favorable stratified combustion is realized. Besides, since the thickness of the fuel spray is relatively small, the fuel does not impinge on the piston even as the piston approaches top dead center, and the injection of the fuel can be continued. Thus, a relatively large amount of fuel can be injected and the region of stratified combustion can be expanded toward the high-load side.

In a direct cylinder injection-type spark-ignition internal combustion engine in which a combustion chamber of a recessed shape is formed in the top surface of the piston, the thickness of the fuel spray is still relatively small making it possible to increase the distance between the lowest and highest positions of the piston where the injected fuel can be introduced into the combustion chamber. Therefore, a relatively large amount of fuel can be introduced into the combustion chamber, and the region of stratified combustion can be expanded toward the high-load side. Furthermore, the triangular fuel spray formed by the fuel injector 7 of this embodiment has a favorable degree of diffusion even on the sides as described above. That is, the fuel is not excessively diffused on both sides of the triangular fuel spray, and the injected fuel can be reliably confined within a predetermined angle θ in the direction of width. This is advantageous for reliably introducing all of the injected fuel into the combustion chamber in the direction of width. Confining the injected fuel within the predetermined angle θ in the direction of width is advantageous for injecting the fuel into an intended position when the fuel is injected at an intake stroke in the direct cylinder injection-type spark-ignition internal combustion engine or when the fuel is injected in the intake port injection-type internal combustion engine.

Figure 4:
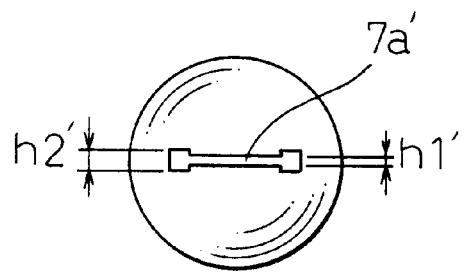
FIG. 4 is a view corresponding to FIG. 3, and illustrates the shape of the injection hole in the fuel injector according to a second embodiment of the present invention.

FIG. 4 is a view corresponding to FIG. 3, and illustrates the shape of the injection hole of the fuel injector according to a second embodiment of the present invention. In the injection hole 7a' of the fuel injector of this embodiment, a through hole at both ends has a relatively large rectangular cross section instead of a circular cross section. In the opening on the outer side of the injection hole 7a', a height (h2') at both ends is larger than a height (h1') at the central portion, and the wall surface resistance decreases at both ends of the injection hole. As in the first embodiment, therefore, the fuel is injected from each portion of the injection hole 7a' at nearly the same velocity, and the degree of diffusion can be nearly equalized. The through hole may have any other polygonal cross section, so long as the height at both ends of the injection hole is larger than the height of the central portion.

Figure 5:
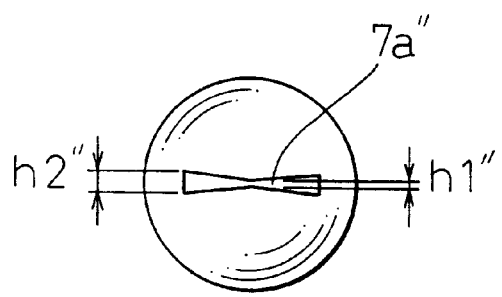
FIG. 5 is a view corresponding to FIG. 3, and illustrates the shape of the injection hole in the fuel injector according to a third embodiment of the present invention.

FIG. 5 is a view corresponding to FIG. 3, and illustrates the shape of the injection hole of the fuel injector according to a third embodiment of the present invention. In the injection hole 7a" of the fuel injector according to this embodiment, the height gradually decreases from both ends (of a height of (h2")) toward the central portion (of a height of (h1")) unlike the first and second embodiments in which the central portion of the opening on the outer side of the injection hole has straight edge portions which are in parallel and opposed to each other. This injection hole 7a", too, makes it possible to decrease the wall surface resistance at both ends of the injection hole. As in the first embodiment, therefore, the fuel is injected from each portion of the injection hole 7a" at nearly the same velocity making it possible to nearly equalize the degree of diffusion.

Figure 6:
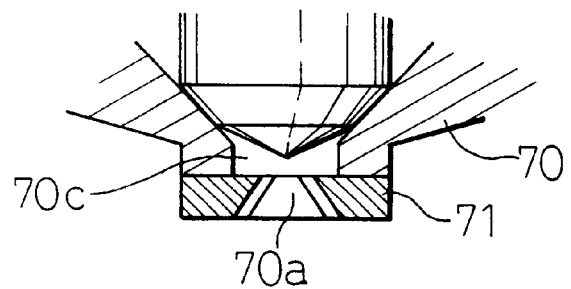
FIG. 6 is a view corresponding to FIG. 2, and illustrates the fuel injector according to a fourth embodiment of the present invention.
Figure 7:
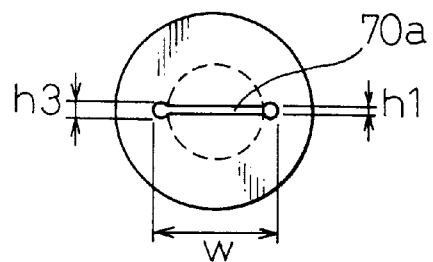
FIG. 7 is a view corresponding to FIG. 3, and illustrates the fuel injector according to the fourth embodiment of the present invention.

FIGS. 6 and 7 are views corresponding to FIGS. 2 and 3, and illustrate the fuel injector according to a fourth embodiment of the present invention. Described below are the differences from the first embodiment. In the fuel injector 70 according to this embodiment, a fuel reservoir 70c has a cylindrical shape, and a tip portion 71 in which an injection hole 70a is formed is mounted as a separate member on the injector body by welding or the like.

The opening on the outer side of the injection hole 70a has a nearly rectangular shape with a width (w) larger than the height (h1). The injection hole 70a has a width that is gradually narrowed inward so as to inject the fuel at a predetermined angle θ in the direction of width. The center of the predetermined angle θ in which the fuel is injected is located on the center axis of the fuel reservoir. A through hole having a circular cross section is formed at both ends of the injection hole 70a. The through hole has a relatively large diameter (h3). In the opening on the outer side of the injection hole 70a, therefore, the height (h3) at both ends is larger than the height (h1) at the central portion.

Upon forming such a fuel reservoir 70c, the fuel pressure does not equally act on each direction of injection of the injection hole 70a, i.e., the fuel pressure acting on both ends of the injection hole becomes smaller than the fuel pressure acting on the central portion of the injection hole. However, if the diameter of the through holes at both ends of the injection hole is set to be larger than that of the first embodiment to greatly decrease the wall surface resistance, the fuel injected from each portion of the injection hole 70a can assume a nearly uniform velocity of injection and, hence, assumes a nearly equal degree of diffusion as in the first embodiment. Such a cylindrical fuel reservoir 70c can be easily machined compared with the hemispherical fuel reservoir 7c of the first embodiment. Besides, the injection hole 70a can be formed by machining at the tip portion 71 of a separate member, making it possible to greatly decrease the cost of production of the fuel injector.

Figure 8:
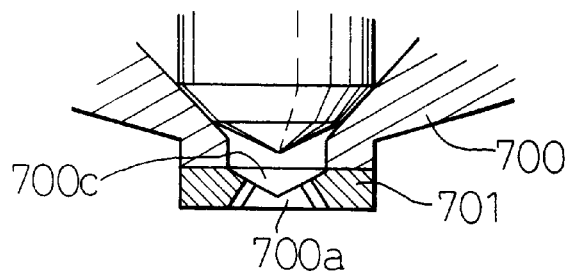
FIG. 8 is a view corresponding to FIG. 6, and illustrates the fuel injector according to a fifth embodiment of the present invention.
Figure 9:
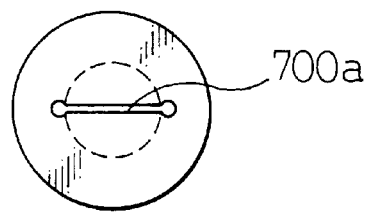
FIG. 9 is a view corresponding to FIG. 7, and illustrates the fuel injector according to the fifth embodiment of the present invention.

FIGS. 8 and 9 are views corresponding to FIGS. 6 and 7, and illustrate the fuel injector according to a fifth embodiment of the present invention. Described below are the differences from the fourth embodiment. In a fuel injector 700 according to this embodiment, a part of a fuel reservoir 700c is formed in a tip portion 701 in addition to an injection hole 700a. The part of the fuel reservoir 700c is a conical shape, and its generating lines intersect both ends of the through holes almost perpendicularly.

Figure 10:
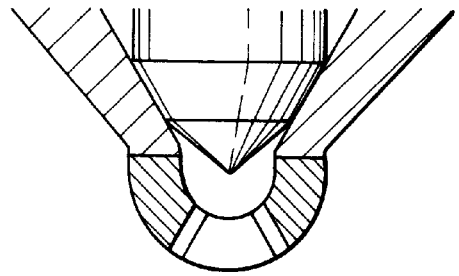
FIG. 10 is a view illustrating a modification of the fourth and fifth embodiments.

Upon forming such a fuel reservoir 700c, though the fuel pressure does not equally act on each direction of injection of the injection hole 700a, the fuel pressure acting on both ends of the injection hole can be elevated to be larger than that of the fourth embodiment so as to be brought close to the pressure of fuel acting on the central portion of the injection hole. Therefore, even if the diameter of the through holes at both ends of the injection hole is not as large as that of the fourth embodiment, the fuel injected from each portion of the injection hole 700a can assume a nearly uniform velocity of injection and, hence, assumes a nearly equal degree of diffusion as in the first embodiment. The part for such a cylindrical fuel reservoir can be easily formed by machining compared with the hemispherical fuel reservoir 7c of the first embodiment. Besides, the injection hole 700a and the part of fuel reservoir which is conical can be formed by machining in the tip portion 701 of the separate member, making it possible to considerably decrease the cost of production of the fuel injector. The idea of using a separate member for forming the tip portion, in which the injection hole is formed, can also be applied to one in which the fuel reservoir has a hemispherical shape as shown in FIG. 10.

In the first embodiment, the fuel reservoir 7c has generally a hemispherical shape. However, only the shape of the boundary portion with the injection hole 7a in the fuel reservoir is important. The fuel pressure acting on each portion of the injection hole 7a can be nearly uniform if the boundary line between the fuel reservoir 7c and the injection hole 7a is an arc on each transverse plane within the height of the injection hole 7a. Based on the same idea, in the fourth and fifth embodiments, the fuel reservoirs may have such shapes that the boundary lines between the fuel reservoirs and the injection holes are straight lines or folded lines on each transverse plane within the height of the injection holes.

What is claimed is:

1. A fuel injector for an internal combustion engine that uses fuel, the fuel injector defines an injection hole, the injection hole has an outer side and an opening on the outer side, the opening has a width generally larger than a height thereof, the width of said injection hole is gradually narrowed inward so that the fuel is injected at the predetermined angle in the direction of width, the height of said injection hole is nearly uniform in the direction of injecting the fuel within said predetermined angle in the direction of width, and a height at both ends of said opening on the outer side of said injection hole is larger than the height at a central portion thereof.

2. A fuel injector according to claim 1, wherein the central portion of said opening on the outer side of said injection hole has linear edge portions that are opposed nearly in parallel with each other.

3. A fuel injector according to claim 1, wherein said injection hole is communicated with a fuel reservoir in said fuel injector, and a boundary line between said fuel reservoir and said injection hole is a straight line on each transverse plane within the height of said injection hole.

4. A fuel injector according to claim 1, wherein said injection hole is communicated with a fuel reservoir in said fuel injector, and a boundary line between said fuel reservoir and said injection hole is an arc on each transverse plane within the height of said injection hole.

5. A fuel injector according to claim 1, wherein said injection hole is communicated with a fuel reservoir in said fuel injector, and a boundary line between said fuel reservoir and said injection hole is a folded line on each transverse plane within the height of said injection hole.

\* \* \* \* \*